United States Patent [19]

Birchall et al.

[11] Patent Number: 4,996,174

[45] Date of Patent: Feb. 26, 1991

[54] PRODUCTION OF CERAMIC MATERIALS

[75] Inventors: James D. Birchall, Mouldsworth, Nr. Chester; Mary J. Mockford, Upton; David R. Stanley, Knutsford, all of England

[73] Assignee: Imperial Chemical Industries Plc, London, England

[21] Appl. No.: 27,270

[22] Filed: Mar. 18, 1987

[30] Foreign Application Priority Data

Mar. 27, 1986 [GB] United Kingdom ............... 8607687
May 20, 1986 [GB] United Kingdom ............... 8612285

[51] Int. Cl.$^5$ ..................... C04B 35/56; C04B 35/58
[52] U.S. Cl. ..................................... 501/87; 501/88; 501/96; 501/97; 501/98; 423/345; 423/409
[58] Field of Search ................. 423/345, 344, 409; 528/12, 29, 9; 501/88, 92, 87, 96, 97, 98

[56] References Cited

U.S. PATENT DOCUMENTS

| | | | |
|---|---|---|---|
| 2,697,029 | 12/1954 | Baker et al. | 502/8 |
| 3,855,395 | 12/1974 | Cutler | 423/345 |
| 4,097,294 | 6/1978 | Rice | 501/87 X |
| 4,584,365 | 4/1986 | Jada | 528/9 |
| 4,671,990 | 6/1987 | Jada | 528/12 X |

FOREIGN PATENT DOCUMENTS

| | | | |
|---|---|---|---|
| 0765064 | 8/1971 | Belgium | 528/29 |
| 0528134 | 7/1956 | Canada | 528/29 |
| 0047143 | 11/1980 | European Pat. Off. | |
| 0082343 | 6/1983 | European Pat. Off. | |
| 0177020 | 2/1984 | Japan | 528/29 |
| 60-122706 | 7/1985 | Japan | |
| 580041 | 11/1980 | United Kingdom | |
| 2172276 | 9/1986 | United Kingdom | |

OTHER PUBLICATIONS

Yajima et al. Chemical Letters 1975 p. 931.
Yajima et al. Nature v. 273 pp. 525 and 527.
Thermochimica Acta, 81, (1984) pp. 77 to 86.
Chemical Abstracts vol. 96, No. 12, Jun. 1982, p. 137, 201996k (Japanese Pat. publ. 81155013).
Journal of American Ceramics Society, vol. 67, No. 10, 1984 (pp. 691–695).
Chemical Abstracts, vol. 104, No. 12, Mar. 1986, p. 338, 93927m.

*Primary Examiner*—Karl Group
*Assistant Examiner*—James M. Hunter, Jr.
*Attorney, Agent, or Firm*—Cushman, Darby & Cushman

[57] ABSTRACT

Process for production of a ceramic material, e.g. a carbide, nitride, boride or silicide, by reacting at least one compound of a metallic or non-metallic element having two or more goups reactive with hydroxyl groups with at least one organic compound having two or more hydroxyl groups to form an oxygen-containing polymeric product, heating the polymeric product to produce a coked product containing carbon and an oxide of the metallic or non-metallic element, and heating the coked product to produce a ceramic maerial, in which the proportion by weight of carbon to the oxide of the metallic or non-metallic element in the coked product is in the range from 50% to 150% of the proportion which is theoretically required to produce the ceramic material.

23 Claims, No Drawings

PRODUCTION OF CERAMIC MATERIALS

This invention relates to a process for the production of a ceramic material which may be, for example, a refractory carbide, nitride, boride or silicide of a metallic or non-metallic element. For example, the ceramic material may be a carbide or nitride of aluminium, boron, silicon, Zirconium, titanium, hafnium, tantalum or tungsten, or a boride or silicide of aluminium, zirconium, titanium, hafnium, tantalum or tungsten, or it may be silicon boride.

BACKGROUND TO THE INVENTION

Particles of refractory carbides or nitrides have traditionally been produced by the so-called carbothermic reaction in which an intimate mixture of carbon and an oxide of the metallic or non-metallic element is heated in an inert atmosphere to produce a carbide, or in an atmosphere of nitrogen to produce a nitride. For example, in the production of silicon carbide an intimate mixture of carbon and silica is reacted according to the overall equation $$SiO_2 + 3C \rightarrow SiC + 2CO.$$

The problems associated with the carbothermic reaction are illustrated by the problems associated with the production of silicon carbide. Thus, in the production of silicon carbide an intimate mixture of carbon and silica is fired in an inert atmosphere at a temperature which may be as high as 2500° C., the firing being effected in an electric furnace. In this process the required stoichiometric proportion of silica to carbon may readily be achieved, that is, three moles of carbon for every mole of silica, i.e. 37.5 weight per cent of carbon and 62.5 weight per cent of silica. However, the process suffers from a problem in that it is difficult to achieve the necessary intimate contact between the carbon and the silica in order that a product of uniform composition may be produced, that is of uniform composition on a molecular scale. In particular, the particles which are produced, which are nominally silicon carbide, may be contaminated with unreated silica and/or carbon. This is the case even when very small particles of silica and carbon are used, for example silica sol and carbon black. Furthermore, in this traditional process it is also difficult to produce particles of silicon carbide having a very small size, e.g. a size of less than 1 micron.

In the production of silicon nitride by the carbothermic reaction silica is similarly reacted with carbon to reduce the silica and the reduced product is reacted with nitrogen according to the overall equation $$3SiO_2 + 6C + 2N_2 \rightarrow Si_3N_4 + 6CO.$$

The carbothermic reaction for the production of silicon nitride suffers from the same problems which are associated with the carbothermic reaction for the production of silicon carbide.

In published Japanese Patent Application No. 60-122706 there is described a modification of the silica reduction process which is said to result in production of silicon nitride in high yield with a high content of $\alpha$-$Si_3N_4$. In this modified process a powder mixture composed of 1 part by weight of silica powder, 0.4 to 4 parts of carbon powder, and 0.005 to 1 part of silicon nitride powder is fired at 1350° to 1550° C. in a nonoxidising atmosphere containing nitrogen or a gaseous nitrogen compound, passed at a rate of 1.0 to 2.0 cm$^3$/sec over the powder mixture. The silicon nitride in the powder mixture serves to accelerate the formation of crystals of silicon nitride.

Silicon nitride may be produced by direct reaction between silicon and nitrogen according to the equation $$3Si + 2N_2 \rightarrow Si_3N_4.$$

However, this process suffers from a disadvantage in that it is generally possible to produce only coarse particles of silicon nitride.

Silicon nitride may also be produced in a gas phase process in which a silicon tetrahalide or a silane is reacted with ammonia. For example, the process may be effected by reacting silicon tetrachloride with ammonia. This process also suffers from a disadvantage in that it produces copious quantities of ammonium chloride which may lead to the presence of chloride impurity in the silicon nitride which is produced.

There are a number of known processes for the production of refractory borides and silicides of metallic or non-metallic elements, particularly processes for the production of such borides and silicides in particulate form.

For example, an oxide of the metallic or non-metallic element in particulate form may be reacted in an inert atmosphere at elevated temperature in admixture with particulate carbon and particulate boron carbide. Alternatively, a particulate mixture of boric oxide, an oxide of the metallic or non-metallic element, and carbon, or a particulate mixture of boron and the metallic or non-metallic element, may be reacted in an inert atmosphere at elevated temperature. An example of the production of a boride is provided by a process for the production of titanium boride according to the reaction scheme $$TiO_2 + B_2O_3 + 5C \rightarrow TiB_2 + 5CO$$

processes suffer from a problem in that it is difficult to achieve the necessary intimate contact between the components of the particulate mixture, for example between the oxide of the metallic or non-metallic element, boric oxide, and carbon, in order to produce particles of uniform composition. Furthermore, the particles of the boride of the metallic or non-metallic element which are produced may be contaminated with unreacted metallic or non-metallic element or oxide thereof and with unreacted boron, boron carbide, or boric oxide, depending of course on the composition of the particulate mixture which is used in the production process. This is the case even when very finely divided particulate mixtures are used, and furthermore, in these processes it is difficult to produce particles of the boride of the metallic or non-metallic element having a very small size, e.g. a size of less than 1 micron.

Silicides of metallic or non-metallic elements may be produced by processes similar to those described for the production of borides except that in this case the boron, or boron carbide, or boric oxide is replaced by silicon, or silicon carbide, or silica or a silicate respectively. For example, a silicide may be produced by heating a particulate mixture of silicon and the metallic or non-metallic element in an inert atmosphere. However, such process suffer from the same problems as are associated with the production of borides of metallic or non-metallic elements.

It has been proposed to produce refractory carbides such as silicon carbide by pyrolysis of organic polymeric materials which contain the elements of the ceramic material, that is silicon and carbon in the case of silicon carbide, but which do not contain oxygen. In such a process the polymeric material is first coked to convert the organic component of the polymeric material to carbon, and the carbon and silicon are then reacted in a pyrolysis reaction. This is not the traditional carbothermic reaction in which carbon and silica are reacted. The objective of using such a polymeric material is to achieve in a coked product produced from the polymeric material a more intimate mixture of the elements of the ceramic material, such as silicon and carbon, than can be achieved, for example in the case of silicon carbide, with a mixture of silica and carbon. However, the proportion of carbon to silicon in the coked product may be very different from that theoretically required with a consequent severely adverse effect on the purity of the silicon carbide which is produced.

An early example of such a "pre-ceramic" polymeric material is provided by U.S. Pat. No. 2 697 029 in which there is described the production of a polymeric material by copolymerization of a silyl substituted monomer, e.g. trimethylsilyl styrene, and another monomer, e.g. divinyl benzene or ethyl vinyl benzene, to give a cross-linked resin, and pyrolysis of the resin to give a solid containing carbon and silicon.

Further examples of such "pre-ceramic" materials are the carbosilanes produced by the pyrolysis of dodecamethylcyclohexasilane (Yajima et al, Chem. Lett., 1975, p931) and by heating poly(dimethylsilane) in an autoclave (Yajima, 1976, Nature, v.273, p525). These carbosilanes may be melt spun to fibrous materials from which refractory silicon carbide may be produced by heating at high temperature. The reaction which is effected at high temperature is between the silicon and carbon and it is not the traditional carbothermic reaction, that is the reaction between silica and carbon, referred to previously. This process suffers from the disadvantage that the silicon carbide product is impure.

A more recent example of such a "pre-ceramic" material from which a refractory carbide may be produced is provided by Japanese Patent Publication No. 57-17412 in which there is described a process in which a halogen compound or an alkoxide of silicon, vanadium, zirconium, tantalum or tungsten is reacted with a carbohydrate and the resultant reaction product is fired. The halogen compound or alkoxide may be, for example, $SiCl_4$, $ZrOCl_2$, $Si(OC_2H_5)_4$, $Si(OC_2H_5)_3C_2H_5$, $Si(OC_2H_5)_2(CH_3)_2$, $Zr(OC_4H_9)_4$, $WCl_2(OC_2H_5)_4$, and the carbohydrate may be, for example, a monosaccharide or a polysaccharide, e.g. glucose, galactose, arabinose, starch, or cellulose. The reaction may be effected in the absence of a solvent but it is preferably effected in the presence of a solvent, for example, an aromatic solvent, e.g. benzene or toluene; an aliphatic solvent, e.g. hexane, heptane or octane; or a halogenated aromatic or aliphatic solvent. A coked reaction product is produced by heating the reaction product in an inert atmosphere and the coked reaction product is fired in an inert atmosphere at a temperature in the range 700° to 2700° C. Prior to firing the coked reaction product may be crushed to a fine powder. Although in this publication it is stated that the reaction between the halogen compound or alkoxide and the carbohydrate may be effected in a solvent and that the solvent may be used in an amount which is sufficient to dissolve or suspend the carbohydrate we find that the carbohydrates which are disclosed are not soluble in the solvents and are only capable of being suspended therein in a particulate form with the result that the reaction does not result in production of a reaction product of uniform composition or which is in a particularly tractable form. Consequently, the refractory carbide produced from the reaction product also does not have a uniform composition. Additionally, the proportion of carbon to silica in the coked reaction product may also be very different from that theoretically required.

A recent development which is described in Thermochimica Acta, 81, (1984), 77-86, is the production of silicon carbide by the pyrolysis of rice hulls. Rice hulls consist of silica and cellulose, which yield a mixture of silica and carbon when thermally decomposed. Rice hulls have a very high surface area and this, together with the intimate contact between the carbon and silica in the thermally decomposed rice hulls, enable silicon carbide to be formed by subsequent pyrolysis at relatively low temperatures. Production may be effected in a two-step process in which rice hulls are coked by heating in the absence of air at a relatively low temperature, e.g. at 700° C., in order to decompose the cellulose into amorphous carbon, and the thus coked rice hulls are heated at a high temperature, e.g. at a temperature of greater than 1500° C. and in an inert or reducing atmosphere to produce silicon carbide. The presence of iron in the rice hulls accelerates the reaction, and iron may be introduced by soaking the rice hulls in ferrous sulphate solution followed by soaking in ammonia. The molar ratio of silica to carbon in the coked rice hulls is generally about 1 to 4.7, that is there is a substantial excess of carbon over the stoichiometrically required proportion of 1:3, but the presence of iron influences this proportion and it is possible to achieve a proportion nearer to that which is stoichiometrically required. However, although the production of silicon carbide from rice hulls results in a product in the form of particles and whiskers, or short fibres, it is not a method which is amenable to the production of silicon carbide in a variety of different physical forms, for example, particles, long fibres, films or coatings. There is indeed a lack of control over the physical form of the silicon carbide which is produced.

Silicon nitride may also be produced by reacting rice hulls with nitrogen at an elevated temperature. Such a process is described in U.S. Pat. No. 3,855,395, the Process comprising the steps of heating rice hulls in an oxygen-free atmosphere to a temperature within the range 1100° C. to 1350° C. and exposing the heated rice hulls to gaseous nitrogen until the silica in the rice hulls is changed to silicon nitride. Production may be effected in a two step process in which rice hulls are coked by heating in the absence of air at a relatively low temperature, e.g. at 700° C., in order to decompose the cellulose into amorphous carbon, and the thus coked rice hulls are heated at high temperature, e.g. at a temperature of the order of 1300° C. and in an atmosphere of nitrogen to produce silicon nitride. However, as is the case with the production of silicon carbide the production of silicon nitride from rice hulls results in a product in the form of particles, whiskers or short fibres, it is not a method which is amenable to the production of silicon nitride in a variety of different physical forms, for example, particles, long fibres, films or coatings. There is indeed a lack of control over the physical form of the silicon nitride which is produced.

The problems associated with these previously described processes for the production of ceramic materials may be summarized with reference to the production of a refractory carbide. Thus, the quality of the refractory carbide which is produced by these previously described processes is dependent at least in part on the composition and structure of the precursor materials from which the carbide is produced and on the processing conditions. For example, although in the production of silicon carbide from a mixture of silica and carbon by the carbothermic process there is no problem in achieving the overall ratio of silica to carbon which is required to produce silicon carbide, it is impossible to achieve the intimate contact between the silica and the carbon in the carbothermic process which is necessary in order to produce a silicon carbide product of uniform composition on a microscale, let alone on a molecular scale, and which is free from unreacted silica and/or carbon.

Where the refractory carbide is produced by pyrolysis of a reaction product, e.g. a polymeric material, which contains the elements of the carbide, such as silica and carbon, e.g. which is produced by a carbothermic reaction between silica and carbon, the elements may not be present in the proportions required for producing the ceramic material substantially free of impurities, and it may be difficult to produce the refractory carbide in the physical form required, for example in the form of small particles, fibres, films or coatings. Thus, the reaction product may be intractable and be difficult to convert into the desired physical form. Where the refractory carbide is produced by pyrolysis of rice hulls there is similarly little control over the physical form of the refractory carbide.

Ceramic materials such as refractory carbides and nitrides have been used for many years in such applications as abrasives and in the manufacture of tools. Whereas in these applications the quality of the ceramic material might not have been of critical importance there are other applications of ceramic materials which are of more recent development where the quality of the ceramic material and its physical form may be of critical importance. These more recently developed applications of ceramic materials include applications such as engineering materials and use in electronic applications.

SUMMARY OF THE INVENTION

The present invention provides a process for the production of a ceramic material which process is adapted to produce a material of uniform quality and composition and which is substantially free of impurities.

According to the present invention there is provided a process for the production of a ceramic material which process comprises producing an oxygen-containing polymeric product by reacting a first reactant which comprises at least one compound of a metallic or non-metallic element having two or more groups reactive with hydroxyl groups with a second reactant which comprises at least one organic compound having two or more hydroxyl groups, heating the polymeric product in an inert atmosphere to produce a coked product containing carbon and an oxide of the metallic or non-metallic element, and heating the coked product to effect a carbothermic reaction between the oxide of the metallic or non-metallic element and the carbon, in which the proportion of the first and second reactants is chosen such that in the coked product the proportion by weight of carbon to the oxide of the metallic or non-metallic element is in the range from 50% to 150% of the proportion which is theoretically required to produce the ceramic material.

DETAILED DESCRIPTION OF THE INVENTION

The nature of the ceramic material which is produced in the process of the invention will depend on the conditions under which the coked product is heated and on the composition of the coked product. For example, the coked product containing carbon and an oxide of the metallic or non-metallic element may be heated in an inert atmosphere to produce a carbide of the metallic or non-metallic element, or the coked product may be heated in an atmosphere of nitrogen or of a reactive nitrogen-containing compound to produce a nitride of the metallic or non-metallic element. Alternatively, where the first reactant comprises a compound of a metallic or non-metallic element and a compound of boron or silicon such that the polymeric product which is produced in the process of the invention comprises that metallic or non-metallic element, boron or silicon, oxygen and carbon and the coked product produced therefrom comprises an intimate mixture of carbon, an oxide of the metallic or non-metallic element, and an oxide of boron or silicon, the coked product may be heated at elevated temperature in an inert atmosphere to produce a boride or silicide of the metallic or non-metallic element.

The proportion of carbon to oxide of the metallic or non-metallic element which is referred to is the proportion in a coked product which is in practice produced by heating the polymeric product in an inert atmosphere and which consists of an intimate mixture of carbon and the oxide or oxides of the metallic or non-metallic element. It is important to understand that the proportion of carbon to oxide of the metallic or non-metallic element which is referred to is not the proportion which would result in the coked product from heating a polymeric product containing the theoretically required proportion of carbon, oxygen and metallic or non-metallic element. Rather, it is the proportion of carbon to oxide of the metallic or non-metallic element which is in practice produced in the coked product by heating the polymeric product. We have found that during the heating of the polymeric product to produce the coked product there may be a substantial loss of certain of the elements present in the polymeric product with the result that, where the polymeric product contains the theoretically required proportion of carbon, oxygen, and metallic or non-metallic element, the proportion of carbon to oxide of the metallic or non-metallic element which is produced in practice by heating of such a polymeric product may be vastly different from the proportion which is theoretically required in the coked product.

In GB Pat. No. 2 172 276 A there is described the production of titanium carbide powder by forming a mixture of an organo-titanate and a carbon precursor polymer in amounts such that the titanium and carbon are present in the stoichiometrically required amounts, converting the mixture to a gel and pyrolysing the polymer to form carbon, and heating to a temperature sufficient to form titanium carbide. The stoichiometrically required amounts are the amounts present in the titanate and in the polymer and not in the pyrolysed product containing carbon.

In order to control the proportion of carbon to the oxide of the metallic or non-metallic element in the coked product produced from the polymeric product the first reactant may comprise more than one compound of a metallic or non-metallic element having two or more groups reactive with hydroxyl groups, and it may also comprise one or more compounds of a metallic or non-metallic element which have only one such reactive group. Similarly, the second reactant may comprise more than one organic compound having two or more hydroxyl groups, and it may also comprise one or more organic compounds which have only one such hydroxyl group.

The proportion of carbon to the oxide of the metallic or non-metallic element in the coked product which is theoretically required will depend of course on the nature of the metallic or non-metallic element and on the stoichiometry of the carbothermic reaction between the carbon and the oxide, and on the nature of the ceramic material which is to be produced. For example, where the oxide has the formula $MO_2$, e.g. as in the case of $SiO_2$, $TiO_2$ and $ZrO_2$, and a carbide is to be produced the carbothermic reaction may be represented as $$MO_2 + 3C \rightarrow MC + 2CO$$

and the theoretically, required molar proportion of oxide to carbon in the coked product is 1 to 3. In the cases of the oxides of silicon, titanium and zirconium the theoretically required proportions by weight of carbon and oxide are:

| $SiO_2$ | 62.5% | carbon: $SiO_2$ | 1:1.67 |
|---|---|---|---|
| carbon | 37.5% | | |
| $TiO_2$ | 68.9% | carbon: $TiO_2$ | 1:2.22 |
| carbon | 31.1% | | |
| $ZrO_2$ | 77.4% | carbon: $ZrO_2$ | 1:3.42 |
| carbon | 22.6% | | |

The stoichiometry of the carbothermic reaction may be different, as in the case of reaction between carbon and the oxide of tantalum to produce tantalum carbide.

$$Ta_2O_5 + 7C \rightarrow 2TaC + 5CO$$

In this case the molar proportion of oxide to carbon which is theoretically required is 1 to 7, which corresponds to 84 weight % of $TaO_2O_5$ and 16 weight % of carbon in the coked product produced from the polymeric product, that is a proportion by weight of carbon:

$Ta_2O_5$ of 1:5.25.

In the production of silicon nitride a coked product which consists of a mixture of silica and carbon is produced in the initial stages of the heating and this mixture is subsequently reacted with nitrogen according to an overall reaction which may be represented as $$3SiO_2 + 6C + 2N_2 \rightarrow Si_3N_4 + 6CO$$

This equation represents the overall reaction which is believed to take place and it is not intended to represent the reaction which may actually take place. It can be seen that the stoichiometric proportion which is theoretically required is a molar proportion of silica to carbon of 1:2, that is 71.4% by weight of silica and 28.6% by weight of carbon, which corresponds to a proportion by weight of carbon to $SiO_2$ of 1:2.5 in the coked product.

In the case of the elements titanium, zirconium and hafnium the oxides of which may be represented by the formula $MO_2$ and the nitrides of which may be represented by the formula MN, the overall reaction may be represented as $$2MO_2 + 4C + N_2 \rightarrow 2MN + 4CO.$$

The stoichiometric proportion which is theoretically required in the coked product is a molar proportion of oxide to carbon of 1:2, which corresponds to the following proportions by weight

| $TiO_2$ | 76.9% | carbon: $TiO_2$ | 1:3.33 |
|---|---|---|---|
| carbon | 23.1% | | |
| $VO_2$ | 77.5% | carbon: $VO_2$ | 1:3.44 |
| carbon | 22.5% | | |
| $ZrO_2$ | 83.7% | carbon: $ZrO_2$ | 1:5.13 |
| carbon | 16.3% | | |
| $HfO_2$ | 89.8% | carbon: $HfO_2$ | 1:8.80 |
| carbon | 10.2% | | |

In the case of the elements boron and aluminium the oxides of which may be represented by the formula $M_2O_3$ and the nitrides of which may be represented by the formula MN, the overall reaction may be represented as $$M_2O_3 + 3C + N_2 \rightarrow 2MN + 3CO.$$

The stoichiometric proportion which is theoretically required in the coked product is a molar proportion of oxide to carbon of 1:3, which corresponds to the following proportions by weight.

| $B_2O_3$ | 65.9% | carbon: $B_2O_3$ | 1:1.93 |
|---|---|---|---|
| carbon | 34.1% | | |
| $Al_2O_3$ | 73.9% | carbon: $Al_2O_3$ | 1:2.83 |
| carbon | 26.1% | | |

In the case of vanadium oxide having the formula $V_2O_5$ and the nitride of vanadium having the formula VN the overall reaction may be represented as $$V_2O_5 + 5C + N_2 \rightarrow 2VN + 5CO$$

A molar proportion of oxide to carbon of 1:5 is theoretically required which corresponds to the following percentages and proportions by weight.

| $V_2O_5$ | 75.2% | carbon: $V_2O_5$ | 1:3.03 |
|---|---|---|---|
| carbon | 24.8% | | |

Where a nitride of another metallic or non-metallic element is to be produced the stoichiometric proportion of carbon to oxide of the element which is theoretically required in the coked product may be calculated in a similar manner.

In the process of the invention the proportion of the first and second reactants is chosen such that in the coked product which may be produced the proportion of carbon to the oxide of the metallic or non-metallic element is in the range of 50% to 150% of the proportion which is theoretically required in the production of the ceramic material. For example, in the case where silicon carbide is to be produced by a carbothermic reaction between silica and carbon the theoretically required proportion corresponds to a portion of carbon to silica of 1:1.67, or 0.6:1, and the range 50% to 150% of the theoretically required proportion corresponds to a proportion of carbon to silica in the range 1:0.84 to 1:2.51, which corresponds to compositions in the range carbon 54.3 weight % and silica 45.6 weight % to carbon 28.5 weight % and silica 71.5 weight %. In the case where silicon nitride is to be produced the theoretically required proportion by weight of carbon to silica is 1:2.5, and the range 50% to 150% of the theoretically required proportion corresponds to a proportion of carbon to silica in the range 1:1.25 to 1:3.75, which corresponds to compositions in the range carbon 44.4 weight % and silica 55.6 weight % to carbon 21.1 weight % and silica 78.9 weight %.

The proportion of carbon to oxide of the metallic or non-metallic element which is theoretically required in a coked product which is subsequently to be converted to a boride or silicide of a metallic or non-metallic element may similarly be estimated.

The closer is the proportion of carbon to the oxide of the metallic or non-metallic element in the coked product to that which is theoretically required the purer is the ceramic material produced from the coked product by the carbothermic reaction, and for this reason it is preferred that this proportion is in the range of 75% to 125% of that which is theoretically required, more preferably in the range 90% to 110% of that which is theoretically required. The selection of reactants and of the proportion thereof to achieve proportions in this desired range will be discussed in more detail hereafter.

In the case of silicon carbide this latter range corresponds to a proportion by weight of carbon silica in the range 1:1.59 to 1.75, which corresponds to compositions in the range carbon 38.6 weight % and silica 61.4 weight % to carbon 36.4 weight % and silica 63.6 weight %. In the case of silicon nitride this latter range corresponds to a proportion of carbon:silica in the range 1:2.38 to 1:2.63, which corresponds to compositions in the range carbon 29.6 weight % and silica 70.4 weight % to carbon 27.5 weight % and silica 72.5 weight %.

The metallic or non-metallic element must be such as to be capable of forming a ceramic material. For example, where a refractory carbide or nitride is to be produced the metallic or non-metallic element may be aluminium, boron, silicon, zirconium, titanium, hafnium, tantalum or tungsten, or where a refractory boride or silicide is to be produced the metallic or non-metallic element may be aluminium, zirconium, titanium, hafnium, tantalum, or tungsten, or the metallic or non-metallic element may be a mixture of boron and silicon where silicon boride is to be produced. The process of the invention is not limited to production of ceramic materials of the metallic or non-metallic elements specifically named.

The first reactant comprises at least one compound of a metallic or non-metallic element having at least two groups reactive with hydroxyl groups, and it may in addition comprise groups which are not reactive with hydroxyl groups. For example, the compound may have a formula $MX_nY_m$ where X is a group which is reactive with hydroxyl groups and Y is a group which is not reactive with hydroxyl groups, M is a metallic or non-metallic element, n is an integer of at least 2, and m is zero or an integer. The group X may be, for example, halide, e.g. chloride or bromide; amide; or alkoxy, e.g. a group of the formula OR where R is an alkyl group having for example from 1 to 8 carbon atoms, e.g. methoxy, ethoxy or butoxy. The group Y, if present in the compound of the metallic or non-metallic element, may be, for example, a hydrocarbyl group, e.g. alkyl, cycloalkyl, aryl or alkaryl. Specific examples of such groups include, methyl, ethyl, propyl, cyclohexyl and benzyl. The group Y may be an oxy group, for example, the compound of the metallic or non-metallic element may be an oxyhalide.

Specific examples of compounds of metallic or non-metallic elements in which all of the groups therein are reactive with hydroxyl groups are tetramethoxysilane, tetraethoxysilane, tetraethoxy zirconium, pentaethoxy tantalum, penta-n-propoxy tantalum, silicon tetrachloride, silicon tetrabromide, titanum tetrachloride, zirconium tetrachloride, dichlorodiethoxy silane, chlorotriethoxy zirconium, dichlorotributoxy tantalum, boron trichloride, boron triisopropoxide, aluminium triisopropoxide and aluminium trichloride.

Examples of compounds of metallic or non-metallic elements which comprise groups which are, and groups which are not, reactive with hydroxyl groups include methyltrimethoxysilane, methyltriethoxysilane, ethyltriethoxysilane, dimethyldiethoxysilane, dimethyldimethoxysilane, diphenyldiethoxysilane and phenyltrimethoxysilane, and silicon oxychloride, and equivalent compounds of other metallic or non-metallic elements.

Where it is desired to produce a boride or silicide of a metallic or non-metallic element the first reactant may comprise a compound of boron or silicon and a compound of a metallic or non-metallic element other than boron or silicon.

In general the compound of the metallic or non-metallic element will not comprise hydroxyl groups as hydroxyl group containing compounds of metallic or non-metallic elements which are capable of forming a refractory carbide are generally unstable, or they may not even exist as hydroxides, or they may readily condense to form a polymeric product, or they may exist as a hydrated oxide rather than as a hydroxide, e.g. as in the case of hydrated alumina.

The second reactant comprises at least one organic compound having two or more hydroxyl groups. The organic compound may be, for example, aliphatic, aromatic, or cycloaliphatic. Examples of suitable aliphatic organic compounds containing two hydroxyl groups include glycols, e.g. ethylene glycol, propylene glycol, butylene glycol and diethylene glycol. Examples of suitable aliphatic organic compounds containing more than two hydroxyl groups include glycerol, trihydroxybutane and trihydroxypentane. Examples of cycloaliphatic organic compounds containing at least two hydroxyl groups include dihydroxycyclohexane and trihydroxycyclohexane. Aromatic organic compounds which comprise two or more hydroxyl groups are advantageous as they comprise a large proportion of carbon and, when incorporated into the polymeric product, assist in achieving the required proportion of carbon to oxide of the metallic or non-metallic element in the coked product produced therefrom. Examples of such aromatic compounds include dihydroxytoluene and dihydroxynaphthalene.

As the reaction between the metallic or non-metallic compound or compounds and the organic compound or compounds to produce the polymeric product is in the nature of a condensation polymerization the first reactant must comprise a metallic or non-metallic compound containing at least two reactive groups, or a plurality of such compounds, and the second reactant must comprise an organic compound containing at least two hydroxyl groups, or a plurality of such compounds.

Various steps may be taken to control the proportion of carbon to the oxide of the metallic or non-metallic element in the coked product produced from the polymeric product. For example, where a relatively high proportion of carbon is required in the coked product the second reactant may comprise an organic compound which contains a cyclic group, e.g. an aromatic or cycloaliphatic group, or a group which is unsaturated, as the loss of carbon when a polymeric product produced from such a compound is converted to a coked product is not great, that is, there is a high carbon yield. Suitable such organic compounds include dihydroxynaphthalene and dihydroxycyclohexane. On the other hand, organic compounds containing aliphatic groups tend to suffer a high loss of carbon when a polymeric product produced from such a compound is converted to a coked product, and the loss of carbon is not greatly dependent on the chain length of the aliphatic group. Thus, where a coked product containing a high proportion of carbon is desired the use of aliphatic glycols and polyols, at least in a high proportion, is not preferred. The production of a polymeric product, and a coked product,...which contains a high proportion of carbon is also favored by use of an additional reactant which comprises an organic compound containing a single hydroxyl group, for example, furfuryl alcohol, cyclohexanol, phenol or a cresol. Such an organic compound containing a single hydroxyl group reacts with the metallic or non-metallic compound to form a unit pendant from the chain of the polymeric product rather than a unit within the chain of the polymeric product. Particularly favored are organic compounds which contain unsaturation, especially unsaturated cyclic groups, e.g. as in furfuryl alcohol, as such compounds yield a high proportion of carbon in the coked product.

Where a relatively high proportion of oxide of the metallic or non-metallic element is desired in the coked product the second reactant may comprise, or may consist of an aliphatic glycol or polyol, e.g. ethylene glycol or glycerol, and/or there may be used an additional reactant, which comprises, a compound of the metallic or non-metallic element having a single group reactive with hydroxyl groups. Such a compound reacts with the organic compound to form a unit pendant from the chain of the polymeric product rather than a unit within the chain of the polymeric product. Examples of such compounds include trialkyl alkoxy silane, e.g. trimethyl ethoxy silane, and corresponding compounds of titanium, zirconium, vanadium, tantalum and other metallic and non-metallic elements.

In order to determine whether or not the proportions of the first and second reactants, and the proportions of the additional reactants, if any, which have been used in the production of the polymeric product are those which are necessary to yield the required coked product it will be necessary to isolate and analyse the coked product, and possibly to experiment with and vary the proportions of and the nature of the reactants until the proportion of carbon to oxide of the metallic or non-metallic element in the coked product is the desired proportion. Thereafter, in operating the process of the invention it will be unnecessary to isolate the coked product during production of the ceramic material, although it may be so isolated if desired.

In the coked product produced from the polymeric product the proportion of carbon may be analysed by ignition of the coked product in an oxidising atmosphere and determining the amount of the carbon dioxide produced, and the amount of the oxide of the metallic or non-metallic element may be determined by chemical analysis. The relative proportions of the first and second reactants, and the additional reactants, if any, and the nature of the reactants, should be chosen, if necessary by means of a certain amount of experimentation, in order to produce the desired proportion of carbon to oxide of the metallic or non-metallic element in the coked product produced from the polymeric product, this latter proportion being capable of being determined by the analytical means hereinbefore referred to.

The conditions under which the compound of the metallic or non-metallic element and the organic compound are reacted will depend on the nature of the compounds and possibly on whether or not a solvent for the compounds is used. It is desirable, in order to assist in the production of a polymeric product of uniform composition, that the reaction mixture of the compounds is vigorously agitated.

It may be advisable, or even necessary, to effect reaction under a dry inert atmosphere, particularly where the compound of the metallic or non-metallic element is readily hydrolysable, for example, where the metallic or non-metallic element is an alkoxide, e.g. where the compound is an alkoxide of silicon or titanium. Some halides of metallic or non-metallic elements, e.g. $SiCl_4$ and $TiCl_4$, are also readily hydrolysable.

The temperature at which reaction is effected will depend on the particular reactants. Thus, with reactants such as silicon tetrahalides or tetraalkoxysilanes and glycols and polyols, e.g. ethylene glycol and glycerol, reaction may be allowed to proceed at or about ambient temperature, although with other reactants, and where reaction is effected in a solvent, it may be necessary to effect reaction at elevated temperature. The reaction temperature will generally not be above the boiling point of the solvent, although a temperature above the boiling point may be used. Where the reaction is a transesterification reaction in which an alcohol is eliminated, e.g. as in the case of reaction of a silicon alkoxide with a hydroxy compound, the reaction temperature is preferably above the boiling point of the alcohol which is eliminated on reaction.

Reaction may be assisted by the presence in the reaction mixture of suitable catalysts, for example, acid catalysts in the case where the reaction is a transesterification reaction. Suitable catalysts for such transesterification reactions are known in the art.

In operating the process of the invention it is particularly preferred that the reactants be chosen to be miscible with each other or to be soluble in a common solvent. Where the reactants are miscible reaction results in production of a polymeric product of uniform composition, and of a composition which is more uniform than that produced from reactants which are not miscible with each other. Where the reactants are not miscible with each other the reaction is preferably effected in a common solvent for the reactants in order that a polymeric product of uniform composition may be produced. Even where the reactants are miscible with each other the reaction may be effected in a common solvent for the reactants. It is also desirable that the polymeric product be soluble in or miscible with the reactants or with the common solvent in order that the polymeric product shall be in the form of a solution and thus in a particularly tractable, form. Such a solution may be spray-dried to produce a small particle size polymeric product which may then be converted to a ceramic material of small and uniform particle size. The polymeric product solution may be used as an adhesive, e.g. for other refractory particles, and the product may subsequently be converted to ceramic material. The solution may be used as a coating composition or film-forming composition from which a coating or a film of ceramic material may be produced. The product solution may be spun into the form of fibres.

The use of miscible reactants, or reactants which are soluble in a common solvent, is preferred as a coked product having a particularly desirable structure is produced from a polymeric product which has itself been produced by reaction of reactants which are miscible with each other, or by reaction of the reactants in solution in a common solvent. The coked product thus produced comprises a particularly homogenous mixture of carbon and oxide of metallic or non-metallic element, and in a further embodiment of the present invention there is provided a coked product which comprises domains of oxide of a metallic or non-metallic element in a matrix of carbon. The domains of oxide of the metallic or non-metallic element may be of small size and can hardly be described as particles. Indeed, examination of the coked product by transmission electron microscopy reveals that the domains of the oxide of a metallic or non-metallic element may have a maximum dimension of less than 500 nanometers (nm), or even less than 100 nm or 25 nm, and that the carbon may be present in the form of a continuous matrix.

Examples of compounds of metallic or non-metallic elements and of organic compounds containing hydroxyl groups which are miscible with each other include tetraethoxysilane and glycerol, optionally containing also furfuryl alcohol, tetraethoxysilane and diethylene glycol, optionally also containing furfuryl alcohol, and triethoxy boron and glycerol when heated to a slightly elevated temperature.

N-methylpyrollidone is a suitable solvent for use with mixtures of tetraethoxysilane and, as the organic compound containing hydroxyl groups, glycerol optionally admixed with furfuryl alcohol, and 1:5 naphthalenediol optionally admixed with furfuryl alcohol. N-methylpyrollidone is a suitable solvent for use with a mixture of triethoxy boron and diethylene glycol, optionally containing furfuryl alcohol.

Ethanol is a suitable solvent for use with a variety of different compounds of metallic or non-metallic elements and organic compounds containing hydroxyl groups, for example titanium tetrachloride and glycerol, titanium tetraethoxide and glycerol, titanium tetraethoxide and glycerol optionally admixed with furfuryl alcohol, aluminium trichloride and glycerol, aluminium triisopropoxide and glycerol optionally admixed with furfuryl alcohol, zirconium tetrachloride, glycerol and furfuryl alcohol, tetraethoxysilane and cyclohexane-1,4-diol, resorcinol or 1,3,5-trihydroxybenzene, and hafnium tetrachloride and glycerol.

In order that the polymeric product which is produced in the reaction may be in a particularly tractable form it is preferred, in the case where reaction is effected in a solvent, that the polymeric product is soluble in the solvent in which reaction is effected, or that it is soluble in another solvent. In order to achieve this solubility it may be desirable to effect reaction for a time less than that required to achieve complete reaction between the reactants in order to avoid an undesirable amount of cross-linking which may result if reaction proceeds to, or near to, completion and which may affect the solubility of the polymeric product. Similarly, where reaction is effected in the absence of a solvent it may be desirable to effect reaction for a time less than that required to achieve complete reaction in order that the polymeric product is in a tractable form, and in particular is in a form in which it may be dissolved in a solvent prior to subsequent processing. However, where the polymeric product which is produced is intractable, and in particular is insoluble, it may for example be ground to a powder before further processing.

Before the polymeric product is used in the subsequent stages of the process of the invention it may be freed of unreacted reactants, if any, e.g. by use of a solvent which selectively removes these reactants, or by precipitation of the polymeric product from solution, or by any other convenient means. However, it may be unnecessary to remove such unreacted reactants as they may be effectively removed from the polymeric product in the subsequent stage of the process.

The polymeric product is heated in an inert atmosphere, for example in vacuum or in an atmosphere of an inert gas or of nitrogen to produce a coked product containing carbon and an oxide of the metallic or non-metallic element. Before doing so, however, the polymeric product, when in the form of a solution in a solvent may be spray-dried to produce a small particle size polymeric product which may then be converted to a coked product of small and uniform particle size. The solution may be used as an adhesive, e.g. for other refractory particles, and the polymeric product may be converted to a coked product. The solution may be used as a coating composition or a film-forming composition from which a coating or film of the coked product may be produced. The polymeric product solution may be spun into the form of fibres.

The temperature at which heating is effected in order to produce a coked product will depend on the nature of the organic component of the polymeric product but in general a temperature of up to 600° C. will suffice, although a higher temperature may be used, e.g. a temperature up to about 800° C. The heating should be effected for a time sufficient for the organic component of the polymeric product to become substantially fully carbonized, for example, for a time sufficient for there to be little or no further loss in weight of the product at the chosen temperature.

In a subsequent stage of the process the coked product is heated to a temperature above that at which the coking stage was effected and at which the carbothermic reaction is effected to produce a ceramic material. A temperature of up to about 1200° C. may suffice, although a higher temperature may be necessary, e.g. a temperature up to 1800° C. The choice of the atmosphere in which to effect the heating will depend on the nature of the ceramic material which is to be produced. Where a carbide or a boride or a silicide is to be produced heating is suitably effected in an inert atmosphere, e.g. in a vacuum or in an atmosphere of an inert gas. Alternatively, where a nitride is to be produced heating is suitably effected in an atmosphere which contains nitrogen or a reactive nitrogen-containing compound. Heating may be effected until there is little or no further loss in weight.

The heating stages of the process, that is the heating to produce the coked product from the polymeric product and the heating to produce the ceramic material from the coked product may be operated in what is virtually a continuous heating program without isolation of the coked product. For example the heating may be effected by progressively raising the temperature and choosing an appropriate atmosphere in which to effect the heating at a particular temperature.

The invention is illustrated by the following Examples.

EXAMPLE 1

41.64 g of tetraethoxysilane and 9.87 g of furfuryl alcohol were charged to a reaction vessel and the resulting solution was heated for 4 hours under nitrogen until no more ethanol was distilled off. 13.5 g glycerol were then added to the solution and the solution was heated and ethanol was distilled off. A rubbery solid was formed in the base of the reaction vessel, and the yield of solid was 66% by weight, calculated on the basis of the amount of ethanol distilled off.

The reaction vessel was then heated on a water bath under vacuum and a gel was formed in the reaction vessel. The gel was soluble in industrial methylated spirit, acetone, 1,1,1-trichloroethylene and in N-methylpyrollidone.

A weighed sample of the gel was placed in a quartz tube and the tube and contents were heated under an atmosphere of nitrogen according to the time/temperature schedule set out in the following Table 1, and the weight loss of the sample was determined periodically.

TABLE 1

| Temperature °C. | Time Minutes | Appearance of solid phase | % loss in weight of solid phase |
|---|---|---|---|
| 125 | 30 | brown liquid | — |
| 250 | 100 | some distillation of clear liquid | 14.0 |
| 300 | 30 | | — |
| 400 | 120 | brown liquid | 60.1 |
| 800 | 60 | black solid | 66.8 |

The yield of the resultant solid coked product was 32.8% by weight of the solid charged to the quartz tube, and the solid comprised 36.4 weight % C and 63.4 weight % $SiO_2$. The proportion by weight of carbon to silica in the coked product was 1 to 1.74 or 0.57 to 1. The theoretical stoichiometric proportion required for the production of silicon carbide is 1:1.67 (37.5 weight % carbon and 62.5 weight % silica) or 0.6 to 1.0. Thus, in the coked product there was a deficiency of carbon and the proportion of carbon to silica was 96% of the theoretical stoichiometric proportion required for the carbothermic reaction.

The black, brittle solid was pyrolysed by heating in an atmosphere of helium at a rate of increase of temperature of 5° C. per minute from ambient temperature up to 400° C. and thereafter at a rate of increase of 10° C. per minute up to 1600° C. and then at 1600° C. for 3 hours.

Examination of the resultant product by X-ray diffraction and Raman specroscopy showed it to contain $\beta$-SiC. The product also contained 3.0 weight % of $SiO_2$ and 2.1 weight % of residual carbon.

EXAMPLE 2

The procedure of Example 1 was followed except that 52.07 g of tetraethoxysilane, 24.53 g of furfuryl alcohol, and 15.35 g of glycerol were used, and a product in the form of a dark brown gel was removed from the reaction vessel. This gel was soluble in 1,1,1-trichloroethane.

The heating procedure of Example 1 up to a temperature of 800° C. was repeated to produce a black solid in a yield of 46% by weight and which comprised 39.2 weight % carbon and 60.8 weight % silica. The proportion by weight of carbon to silica was 1:1.55, or 0.65:1 and the proportion of carbon to silica was 108% of the stoichiometric proportion required for the production of silicon carbide in a carbothermic reaction.

EXAMPLE 3

20.59 g of tetraethoxysilane and 5.12 g of furfuryl alcohol were charged to a reaction vessel and the resulting solution was stirred and heated under nitrogen until no more ethanol was distilled off. 6.80 g of glycerol were then added to the cooled solution and the solution was stirred and heated up to 90° C. and ethanol was distilled off. A rubbery solid was formed in the base of the reaction vessel, and the yield of solid was 96.3% by weight, calculated on the basis of the amount of ethanol distilled off.

A weighed sample of the solid was placed in a quartz tube and the tube and contents were heated under an atmosphere of nitrogen according to the time/temperature schedule set out in the following Table 2, and the weight loss of the sample was determined periodically.

TABLE 2

| Temperature °C. | Time Minutes | Appearance of Solid phase |
|---|---|---|
| 150 | 60 | Gel |
| 250 | 60 | Gel |
| 400 | 120 | Black solid |
| 800 | 120 | Hard, black shiny solid |

The yield of the resultant solid was 46.2% by weight of the solid charged to the quartz tube, and the solid comprised 30.0 weight % C and 70.0 weight % $SiO_2$. The proportion of weight of carbon to silica in the coked product was 1:2.33. The theoretical stoichiometric proportion required for the production of silicon nitride is 1:2.5 (28.6 weight % carbon and 71.4 weight % silica). Thus, in the coked product the proportion by weight of carbon to silica was 107.3% of the theoretical stoichiometric proportion required.

The black solid was pyrolysed by heating in a tube of alumina in an atmosphere of nitrogen at a rate of increase of temperature of 5° C. per minute from ambient temperature up to 400° C. and thereafter at a rate of increase of temperature of 10° C. per minute up to 1650° C. and then at 1650° C. for 6 hours.

Examination of the resultant product by infrared and X-ray diffraction analysis indicative that it comprises $\alpha$-$Si_3N_4$ and a small proportion of silica contaminant.

EXAMPLES 4 to 9

In six separate examples a coked product was produced following the procedures as hereinafter described.

EXAMPLE 4

166.4 g of tetraethoxysilane (0.8 mole) and 55.2 g of glycerol (0.6 mole) were charged to a reaction vessel as used in Example 1 and the resulting mixture was stirred and heated until no more ethanol distilled out of the mixture. A clear rubbery gel was obtained, the yield of ethanol being 86% of theoretical based on the glycerol used.

A weighted sample of the rubbery gel was placed in a quartz tube and the contents placed under an atmosphere of dry nitrogen and heated over a period of 7 hours to a final temperature of 800° C. A black, friable product was obtained with a yield of 25.5% by weight and the product comprised 16% by weight of carbon and 84% by weight of silica. Thus in the coked product the proportion of carbon to silica 1:5.25, that is 31.8% of the theoretical stoichiometric proportion required for the carbothermic reaction to silicon carbide.

EXAMPLE 5

83.2 g of tetraethoxysilane (0.4 mol) and 48.4 g of glycerol (0.53 mol) were reacted according to the procedure of Example 4. The yield of ethanol was 82% of the theoretical amount based on the amount of glycerol used.

The gel product was heated to 800° C. following the procedure of Example 4 to yield a black, friable material in 42% by weight yield. The coked product comprised 17.5% by weight of carbon and 82.5% by weight of silica. Thus the proportion of carbon to silica was 1:4.71, that is 35.5% of the theoretical stoichiometric proportions required for the carbothermic reaction to silicon carbide.

EXAMPLE 6

52.1 g of tetraethoxysilane (0.25 mol) and 69.1 g glycerol (0.75 mol) were reacted following the procedure of Example 4. The yield of ethanol was 80% based on the amount of tetraethoxysilane used. The product was obtained as a clear viscous liquid, setting to a firm gel on cooling to room temperature. The product was heated to 800° C., according to the procedure of Example 4 giving a black, porous solid in 16.6% by weight yield. The coked product comprised 17.7% by weight carbon and 82.3% by weight of silica. Thus the proportion of carbon to silica was 1:4.65, that is 35.9% of the theoretical stoichiometric proportion required for the carbothermic reaction to silicon carbide.

EXAMPLE 7

83.2 g of tetraethoxysilane (0.4 mol), 10 ml of ethanol and 24.2 g mannitol (0.13 mol) were charged to a reaction vessel as used in Example 4. The reaction mixture was stirred and heated until no more ethanol distilled from the mixture. A white, waxy solid was obtained, the yield of ethanol being 80% by weight of that expected based on the amount of mannitol used.

A portion of the solid was placed in a quartz tube and the contents placed under a dry nitrogen atmosphere and heated over a period of 8 hours to 800° C. to give a black friable solid. The coked product comprised 13.4% by weight of carbon and 86.6% by weight of silica. Thus, the proportion of carbon to silica in the coked product was 1:6.46, that is 25.8% of the theoretical stoichiometric proportion required for the carbothermic reaction to silicon carbide.

EXAMPLE 8

52.07 g of tetraethoxysilane (0.25 mol) and 24.53 g of furfuryl alcohol (0.25 mol) were charged to a reaction vessel as used in Example 4 and the resulting solution was stirred and heated under nitrogen until no more ethanol was distilled off. 15.35 g of glycerol (0.167 mol) was then added to the cooled solution and the solution was heated again under nitrogen until no more ethanol was distilled off. A brown gel was formed which hardened on cooling and the overall yield of ethanol was 89% by weight of that expected based on the amounts of furfuryl alcohol and glycerol used.

A portion of the hardened gel was placed in a quartz tube and the contents placed under an atmosphere of dry nitrogen and heated over a period of 5 hours to 800° C. The coked product obtained in 37.5% yield by weight, comprised 39.2% by weight of carbon and 60.8% by weight of silica. Thus the proportion of carbon to silica in the coked product was 1.55, that is 107% of the theoretical stoichiometric proportion required for the carbothermic reaction to silicon carbide.

EXAMPLE 9

10.40 g of tetraethoxysilane (0.05 mol) and 9.81 g of furfuryl alcohol (0.1 mol) were charged to a reaction vessel as used in Example 4 and the resulting solution was stirred and heated under nitrogen until no more ethanol was distilled off 5.3 g of naphthalene-1,5-diol (0.05 mol) and 20 ml N-methylpyrrolidone as solvent were added to the reaction vessel to form a slurry.

The mixture was heated under nitrogen and eventually all the solids dissolved to give a dark brown solution. Heating was continued until all the ethanol formed in the reaction had been removed by distillation. The overall yield of ethanol was 82% of that expected based on the amount of tetraethoxysilane used. The solvent was removed by distillation under reduced pressure.

The resultant product had a toffee-like consistency and was very dark brown in colour. A portion of this product was placed in a quartz tube under nitrogen and heated over a period of 7 hours to 800° C. The coked product, obtained in 53.6% by weight yield, comprised 80% by weight of carbon and 20% by weight of silica. Thus the proportion of carbon to silica in the coked product was 4,1, that is 666% of the theoretical stoichiometric proportion required for the carbothermic reduction to silicon carbide.

In the following Table 3 the proportions of the reactants used in Examples 4 to 9 and the effect on the proportion of carbon to silica in the coked product as a proportion of that which is theoretically required for the production of silicon carbide are summarized.

Examples 4 to 7 and 8 are by way of comparison and Example 8 illustrates the process of the invention. By comparing Examples 4 to 6 it can be seen that when the organic hydroxy compound is an aliphatic hydroxy compound, namely glycerol, variation of the proportion of organic hydroxy compound to the first reactant, tetraethoxysilane, which is used in the production of the polymeric product has little effect on the proportion of carbon to silica in the coked product produced from the polymeric product. The proportion of carbon to silica is substantially less than that which is required. Example 7 shows that change of the nature of the aliphatic alcohol also has little effect. On the other hand, Example 8 shows that when a cyclic aliphatic monohydroxy compound which is also unsaturated, furfuryl alcohol, is used in combination with glycerol as the second reactant it is possible to vary and control the proportion of carbon to silica in this coked product produced from the polymeric product, and to produce a coked product having a proportion of carbon to silica very close to that theoretically required.

The coked products from Examples 4, 8, and 9 were separately heated in a quartz tube in an atmosphere of helium at a rate of increase of temperature of 5° C. per minute until a temperature of 1600° C. was reached, and the tubes and contents were then heated at 1600° C. for 10 hours.

TABLE 3

| Example | First reactant Tetraethoxy silane moles | Second reactant Glycerol moles | Second reactant Mannitol moles | Furfuryl alcohol moles | Naphthalene 1;5-diol moles | Moles Ethoxy groups | Moles Hydroxy groups | Molar ratio Ethoxy: Hydroxy groups | Carbon to Silica in coked product as % by weight of theoretical |
|---|---|---|---|---|---|---|---|---|---|
| 4 | 0.8 | 0.6 | | | | 3.2 | 1.8 | 1.79 | 31.8 |
| 5 | 0.4 | 0.53 | | | | 1.6 | 1.59 | 1.0 | 35.5 |
| 6 | 0.25 | 0.75 | | | | 1.0 | 2.25 | 0.44 | 35.9 |
| 7 | 0.4 | | 0.13 | | | 1.6 | 0.78 | 2.05 | 25.8 |
| 8 | 0.25 | 0.167 | | 0.25 | | 1.0 | 0.75 | 1.33 | 107 |
| 9 | 0.05 | | | 0.1 | 0.1 | 1.0 | 1.0 | 1.0 | 666 |

The ceramic material produced from the coked product of Example 8 comprised 92.1% by weight of $\beta$-SiC and 6.6% by weight of carbon.

By way of comparison the ceramic material produced from the coked product Of Example 4 comprised 24.4% by weight of $\beta$-SiC and 75.6% by weight of $SiO_2$, the very substantial proportion of $SiO_2$ in the ceramic material being caused by the low proportion of carbon to silica in the coked product compared with that theoretically required for the carbothermic reaction. By way of further comparison the ceramic material produced from the coked product of Example 9 comprised 14.9% by weight of $\beta$-SiC and 85.1% by weight of carbon, the substantial contamination by carbon being caused by the very high proportion of carbon to silica in the. coked product compared with that theoretically required for the carbothermic reaction.

EXAMPLE 10

The procedure of Example 1 was repeated except that zirconium tetraethoxide (5.0 g), furfuryl alcohol (2.69 g), and glycerol (6.28 g) were reacted in the presence of an added volume of ethanol (25 ml) to solubilize the zirconium tetraethoxide. The polymeric product which was produced was in the form of a yellow-white solid.

The solid was heated up to a temperature of 800° C. following the procedure described in Example 1 to produce a coked product in the form of a black solid in a yield of 31.1% by weight and which comprised 25.3% by weight of carbon and 74% by weight of zirconia. The proportion of weight of carbon to zirconia was 1:2.95, or 0.34:1, whereas the theoretically required stoichiometric proportion required for the carbothermic reaction to produce zirconium carbide is 1:3.42, or 0.29:1 (22.6 weight % carbon and 77.4 weight % zirconia). Thus, in the coked product the proportion of carbon to zirconia is 117.2% of that which is theoretically required.

The coked product was heated in vacuum at 5° C. per minute up to 1500° C. and thereafter at 1500° C. for 2 hours.

X-ray examination of the resultant ceramic material showed it to consist of zirconium carbide with a trace of graphite and possibly a trace of zirconia. Chemical analysis showed the zirconium carbide contained 2 weight % of carbon and 8.5 weight % of zirconia.

EXAMPLE 11

The procedure of Example 1 was followed except that titanium tetraisopropoxide (28.39 g), furfuryl alcohol (5.14 g) and glycerol (4.84 g) were reacted and a polymeric product in the form of a dark brown gel was removed from the reaction vessel.

The heating procedure of example 1 was followed up to a temperature of 800° C. to produce a coked product in a yield of 400 weight % and which comprises 29.4 weight % carbon, 70.6 weight % titania. The proportion by weight of carbon to titania was 1:2.40, or 0.42:1, and the theoretical stoichiometric proportion required for the production of titanium carbide is 1:2.22, or 0.45:1, (31.06 % carbon and 68.9 weight % titania). Thus in the coked product, the proportion of carbon to titania was 93.3% of the theoretical stoichiometric proportion required for the carbothermic reaction.

The coked product was heated in a vacuum at a rate of increase of temperature of 50 C./min from ambient temperature to 500° C., and thereafter at a rate of increase of 70° C./min to 1600° C. and then at 1600° C. for 2 hours.

Examination of the resultant ceramic material by X-ray diffraction showed it to contain titanium carbide with a small amount of $TiO_2$ detected. Inorganic analysis showed the product showed the product to contain 99.7% TiC and 0.3% $TiO_2$.

EXAMPLE 12

The procedure of Example 1 was followed to produce a polymeric product except that tetraethoxysilane (2,440.0 g), furfuryl alcohol (578.0 g) and glycerol (791.0 g) were used.

The heating procedure of Example 1 was repeated up to 800° C. to produce a coked product in yield of 35.0% by weight which comprised 39.98 weight % of carbon, 60.0 weight % silica. The proportion by weight of carbon to silica in the coked product was 1:1.50 or 0.67:1. The theoretical stoichiometric proportion required for the production of silicon carbide in the coked product is 1:1.67 or 0.60:1 (37.5 weight % carbon and 62.5 weight % silica). Thus in the coked product, the proportion of carbon to silica was 111.6% of the theoretical stoichiometric proportion required for the carbothermic reaction.

The coked product was pyrolysed by heating in helium at a rate of increase of temperature of 5° C./min from ambient temperature to 1600° C. and then at 1600° C. for 10 hours.

Examination of the resultant ceramic material (produced in a weight yield of 30.7%) by X-ray diffraction showed it to contain $\beta$-SiC with a small amount of $\alpha$-SiC. Analysis showed the product to contain 92.1% SiC and 6.6% carbon.

EXAMPLE 13

The procedure of example 1 was followed to produce a polymeric product except that aluminium isopropoxide (10.2 g) was added to a solution of 1,3,5-trihydroxybenzene (7.0 g) in ethanol (25 cm$^3$) with a small cube of sodium. The polymeric product was in the form of a white solid.

The heating procedure of example 1 was repeated up to a temperature of 800° C. to produce a coked product in a yield of 30.6 weight % and which comprised 32.7 weight % carbon, 67.2 weight % alumina. The proportion by weight of carbon to alumina was 1:2.06, or 0.49:1 and the theoretical stoichiometric proportion required is 1:2.83, or 0.35:1 (26.1 wt % C, 73.9 wt % Al$_2$O$_3$). Thus in the coked product, the proportion of carbon to alumina was 140% of the theoretical stoichiometric proportion required for carbothermic reduction.

The coked product was pyrolysed by heating in nitrogen at a rate of increase of temperature of 5° C./min from 200° C. to 500° C., thereafter at a rate of 7° C./min to 1600° C., and at 1600° C. for 10 hours.

Examination of the resultant ceramic material (produced in a weight yield of 52.8%) by X-ray diffraction showed it to contain aluminium nitride. Analysis showed the product to contain aluminium nitride and 9 weight % carbon.

What is claimed is:

1. A process for the production of a ceramic material which process comprises reacting a first reactant which comprises at least one compound of a metallic or non-metallic element having two or more groups reactive with hydroxyl groups with a second reactant which comprises at least one organic compound having two or more hydroxyl groups to produce an oxygen containing polymeric product, heating the oxygen-containing polymeric product in an inert atmosphere to produce a coked product containing carbon and an oxide of the metallic or non-metallic element, and heating the coked product to effect a carbothermic reaction between the oxide of the metallic or non-metallic element and the carbon to produce a ceramic, in which the proportion of the first and second reactants is chosen such that in the coked product the proportion by weight of carbon to the oxide of the metallic or non-metallic element is in the range from 50 to 150% of the proportion which is theoretically required to produce the ceramic material.

2. A process as claimed in claim 1 in which the proportion of carbon to the oxide of the metallic or non-metallic element in the coked product is in the range from 75 to 125% of the proportion which is theoretically required to produce the ceramic material.

3. A process as claimed in claim 2 in which the proportion of carbon to the oxide of the metallic or non-metallic element in the coked product is in the range from 90% to 110% of the proportion which is theoretically required to produce the ceramic material.

4. A process as claimed in any one of claims 1 to 3 in which the metallic or non-metallic element is selected from the group consisting of aluminium, boron, silicon, zirconium, titanium, hafnium, tantalum and tungsten.

5. A process as claimed in claim 4 in which the ceramic material which is produced is a carbide or nitride.

6. A process as claimed in claim 5 in which the first reactant comprises a compound of formula MX$_n$Y$_m$ where X is a group which is reactive with hydroxyl groups, Y is a group which is not reactive with hydroxyl groups, M is a metallic or non-metallic element, n is an integer of at least 2, and m is zero or an integer.

7. A process as claimed in claim 6 in which in the first reactant the group X is selected from the group consisting of a halide, amide, and alkoxy group.

8. A process as claimed in claim 7 in which the second reactant is selected from the group consisting of an aliphatic, aromatic and cycloaliphatic compound containing two or more hydroxyl groups.

9. A process as claimed in claim 8 in which the second reactant comprises ethylene glycol or glycerol.

10. A process as claimed in claim 9 in which there is used an additional reactant which comprises an organic compound having a single hydroxyl group.

11. A process as claimed in claim 10 in which the additional reactant comprises an organic compound having an unsaturated cyclic group.

12. A process as claimed in claim 11 in which the additional reactant comprises furfuryl alcohol.

13. A process as claimed in claim 12 in which there is used an additional reactant which comprises a compound of a metallic or non-metallic element having a single group reactive with hydroxyl groups.

14. A process as claimed in claim 1, wherein the first reactant and the second reactant are miscible with each other.

15. A process as claimed in claim 14 in which reaction is effected in a common solvent for the first reactant and the second reactant.

16. A process as claimed in claim 15 in which the polymeric product is produced in the form of a solution.

17. A process as claimed in claim 15 in which the solvent comprises ethanol.

18. A process as claimed in claim 17 in which the polymeric product is heated at a temperature of up to 800° C. in an inert atmosphere to produce the coked product.

19. A process as claimed in claim 18 in which the coked product is heated to produce ceramic material at a temperature above that at which the polymeric product was heated to produce the coked product.

20. A process as claimed in claim 19 in which the coked product is heated at a temperature of up to 1800° C.

21. A process as claimed in claim 20 in which the coked product is heated in an inert atmosphere to produce a carbide of a metallic or non-metallic element.

22. A process as claimed in claim 20 in which the coked product is heated in an atmosphere which contains nitrogen or a reactive nitrogen-containing compound to produce a nitride of a metallic or non-metallic element.

23. A process according to claim 1 wherein the first reactant is a compound of formula MX$_n$Y$_m$ where X is a group which is reactive with hydroxyl groups, Y is a group which is unreactive with hydroxyl groups, M is a metallic or non-metallic element selected from the group consisting of aluminum, boron, silicon, zirconium, titanium, hafnium, tantalum and tungsten, n is an integer of at least 2, and m is zero or an integer and the second reactant is selected from the group consisting of aliphatic, aromatic and cycloaliphatic hydroxy-substituted hydrocarbons containing two or more hydroxyl groups.

* * * * *